(12) United States Patent
Spangler (10) Patent No.: US 6,270,123 B1
(45) Date of Patent: Aug. 7, 2001

(54) COLOR SELECTION AND IDENTIFICATION GUIDES FOR ARCHITECTURAL SURFACE COATINGS

(75) Inventor: Michael C. Spangler, Doylestown, PA (US)

(73) Assignee: Creanova Inc., Somerset, NJ (US)

( * ) Notice: Subject to any disclaimer, the term of this patent is extended or adjusted under 35 U.S.C. 154(b) by 0 days.

(21) Appl. No.: 09/073,882

(22) Filed: May 6, 1998

(51) Int. Cl.$^7$ ...................................................... B42D 15/00
(52) U.S. Cl. .............................. 283/114; 283/114; 434/81; 434/84; 434/98; 434/103; 40/124.2; 40/124.4
(58) Field of Search ................................. 283/114; 434/98, 434/81, 103, 84; 40/124.4, 124.2

(56) References Cited

U.S. PATENT DOCUMENTS 4,992,050 * 2/1991 Edwards ................................. 434/98
5,818,032 * 10/1998 Sun et al. ............................. 283/114

* cited by examiner

Primary Examiner—Willmon Fridie, Jr.
Assistant Examiner—Daniel Phan
(74) Attorney, Agent, or Firm—Abelman, Frayne & Schwab (57) ABSTRACT

A color identification and selection display for use in connection with the retail sale of custom-tinted architectural coatings and paints is based on lightness values or levels and is assembled from a plurality of take-home cards in the form of elongated strips that are placed with their longer axis in horizontal rows, each strip containing a plurality of color fields arranged in stripes separated by narrow neutral bands. Adjacent color stripes in a given row are of closely related hues that preferably decrease in wave length when moving from left to right along any given horizontal row. Since each strip contains a plurality of closely related colors, only one, or perhaps two, take-home cards need be removed to assist in the final selection of the desired color. Each horizontal row includes a family of colors formulated from a single type of base, i.e., a tint base, a pastel base, a deep base or an accent base. The horizontal rows are preferably arranged in a descending level of lightness, with the lightest pastel colors in horizontal rows at the top and the darkest colors prepared from the accent base in the lowest horizontal row. Methods for producing the color strips and other types of color identification and selection aids are provided.

25 Claims, 8 Drawing Sheets

COLOR SELECTION AND IDENTIFICATION GUIDES FOR ARCHITECTURAL SURFACE COATINGS

FIELD OF THE INVENTION

The invention relates to color selection and identification guides for use in connection with the retail sale of custom-tinted architectural coatings, or paints, and for use by interior decorators, designers, and architects.

BACKGROUND OF THE INVENTION

As a result of advances in color computer matching and in the development of precise metering and dispensing machines, paint manufacturers and producers of pigment dispersions, or colorants, have prepared formulating guides for as many as six thousand different colors for interior and exterior architectural coatings. With this many colors, it may be difficult for all but those having excellent color perception, or trained technicians, to discern the differences between closely-related hues in the color spectrum.

A system containing a lesser number of colors, for example, 2300 colors, does result in differences between colors which are generally discernable by consumers having average color perception. Many paint manufacturers have found that systems having about 1200, or 900, or as few as about 600 different colors are sufficient to satisfy their retail markets.

It will be understood that the manufacturer's decision with respect to the number of different colors to be offered in the system is of great practical and economic significance. Each system, whether it has 600 or 2300 different colors, must be supported by a variety of color identification and/or selection guides. A variety of color identification and selection guides have been developed for use in connection with the sale of protective and decorative coatings and architectural finishes, which for convenience, will hereafter be referred to collectively as "paints. These guides take the form of display racks into which are placed elongated paper strips that have been coated with a plurality of stripes of different colors representative of the colors of the dried finishes produced by the custom mixed paints. Each position in the rack is stocked with a permanently affixed paper strip and a number of identical removable take-home strips for use by prospective customers. The strips are provided in sizes that range from about two-by-three inches, to four to six inches, or up to 9.5 inches in length by about 1.5 to 2.5 inches in width. This type of merchandising aid, or sales tool, must be supported by an inventory of refills of the colored take-home strips.

Other types of merchandising aids include fan decks which are constructed from a stack of elongated strips ranging in length from about seven inches to about eleven inches and measuring from about 1.5 inches to about 2.5 inches in width, the stack being provided with a front and rear cover and assembled with a threaded fastener through one corner. Each of the elongated strips is provided with a plurality of color stripes, usually separated by white or neutral transverse lines extending across the width of the strip. The strips employed in the fan deck employ the same colors in the same sequence as appear on the strips placed in the display rack, and typically combine two different, but somehow related take-home strips in a single strip that is approximately twice the length of the take-home strip.

Other types of merchandising aids include counter books which have pages containing color chips for all of the colors in the system; and architects files and architects binders in the form of perforated sheets that permit the easy separation from the sheets of smaller rectangular color chips for use in connection with architectural drawings, color schemes, or for use in connection with the selection of interior decor and furnishings.

As presently designed and used, the elongated paper strip take-home cards placed in the display racks, and as assembled into the fan decks, typically include four or five related colors, but the colors range from a very light pastel to a so-called deep tone or accent tone, these latter two being more saturated with color than the pastel and mid-tone colors. It has been found that the great majority of consumers are initially interested in, and eventually purchase the pastels, or lighter colors in the spectrum. Thus, in removing take-home cards from the display racks of the prior art, the customer is only interested in one of the five colors on each strip. Moreover, because the customers will want to have several closely-related pastels to take home for final selection, a number of adjacent cards must be removed from the rack. In each case, the card has five greatly varying colors, even though the customer has an interest that is limited to only the pastel color stripe on each of the several cards. The retailer must, of course, be attentive to restocking the rack to insure that there is an adequate supply of take-home cards in each position. Storage and inventorying the replacement cards can be problematical, not only from the view point of the individual retailer (whether it be a neighborhood hardware store or national home center), but also for the paint manufacturer. Both checking the condition of the rack and adding individual cards requires care and time, thus adding labor charges to the cost of employing the prior art system.

It is therefore an object of the present invention to provide an improved color display and selection system which is based on lightness values, or levels, that can be vertically or horizontally arranged and that ranges from pastels through accent colors. Another object of this invention is to provide a color display and selection system that is more economical for the paint or colorant manufacturer to produce and which is also more economical for the paint retailer to maintain.

It is a further object to provide an improved color display and selection system which provides the prospective customer with a take-home card which contains only a plurality of closely-related color stripes from the same family or type of base paint, whether it be a pastel, tint, deep or accent base.

It is another object of this invention to provide an improved color display and selection system in which the take-home cards or strips containing the pastel colors are significantly larger than the other base colors.

Another object of the invention is to provide an improved color system that is better organized than the presently known systems used in connection with the selection and retail sales of custom-mixed paints from the standpoint of ease of selection by the consumer, the simplicity of the color schemes and in providing a greater visual difference between the colors displayed.

It is yet another object of the invention to provide the paint manufacturers and retailers with greater flexibility in deciding on the size of the system, or the number of colors to be offered, providing a system that is easy to customize, including by having fewer or greater numbers of bases, to expand or reduce the number of colors offered to account for market size as well as regional preferences, to provide greater versatility in the layout or organization of the colors in the rack and as a result of one or more of the above objectives to provide a cost savings, as compared to systems of the prior art.

In describing the invention, the following terms will be understood to have the indicated meanings:

Base—any one of a predetermined number of liquid paint compositions comprising the vehicle, binder, various additives and, optionally, titanium dioxide, to which the pigment dispersion or colorant is added. The base can be of the water borne type (e.g., latex) or the solvent borne type (e.g., alkyd). The paint retailer must maintain an inventory of each of the different types of bases required to custom-mix with the colorants to obtain the colors displayed on the take-home cards, color selection and identification panels, color chips and other merchandising or sales aids provided for the system.

Pastel Base—a base containing from 1.7 to 2.5 pounds, but preferably from 2.0 pounds to 2.2 pounds of titanium dioxide and comprising 124–128 fluid ounces; up to 2 ounces of colorant can be added to provide about a gallon (128 ounces) of paint. A pastel base without colorant contains sufficient hiding power to be used as a paint due to its titanium dioxide content.

Tint Base—a base containing from 1.5 to 2.0 pounds, but preferably from about 1.5 pounds to 1.68 pounds of titanium dioxide in 122–126 fluid ounces; from two ounces to four ounces of colorant can be added to provide about a gallon of paint.

Deep Base—a base containing from 0.5 to 1.0 pounds, but preferably from 0.50 pounds to 0.68 pounds of titanium dioxide in 118–124 fluid ounces; up to eight ounces of colorant can be added to provide about a gallon of paint.

Accent Base—a clear or transparent base consisting of 112–118 fluid ounces containing no titanium dioxide; up to twelve ounces of colorant can be added to provide about a gallon of paint Alkyd Paint—paints using alkyd resins as vehicles; these paints are thinned with solvent, such as mineral spirits.

Latex Paint—paints using emulsion resins as binders; these can be acrylic, butadienestyrene, polyvinyl acetate or vinyl-acrylic emulsion resin vehicles, and are thinned with water.

Chroma—the brightness or dullness of a color; the saturation of a color.

Hue—the color being considered, for example, red, blue, yellow, green, etc. through the visible color spectrum.

Value—the lightness or darkness of a color; white is at one end and black is at the other.

Inorganic Colorants—earth colors; usually oxides such as red, yellow, brown or umber which are high-hiding pigments due to opacity and concentration.

Mass Tone Color—usually the darkest color concentration in which the hue of the color can be distinguished. In color systems, the 12 ounce-per-gallon level is called mass-tone. This is normally the maximum addition of colorant because greater amounts can weaken paint film properties.

Organic Colorants—producing by organic chemical synthetis ; pigments are brighter, clearer and cleaner and are used alone to provide pastel hues.

Tinting Base Strength—the whiteness of a base; the higher the titanium content, the lighter the color value will be with an established level of colorant.

SUMMARY OF THE INVENTION

The above objects and other advantages are achieved by the improved color display and selection system of the invention in which a plurality of closely-related color fields are displayed, for example, as individual color stripes positioned in side-by-side relation on an elongated paper strip. In one preferred embodiment, the elongated strips are placed horizontally in a display rack comprising from about 600 to about 2000, or more, individual color fields or hues. In an especially preferred embodiment, each paper strip is coated with three closely-related colors, for example, decreasing in the wave-length of light from left to right. As will be appreciated by one familiar with the art, the design and construction of display racks is adapted to receive the elongated color strips in the horizontal configuration of the invention, since racks of the prior art in use today are configured to receive the strips in a vertical array, i.e., with the long axis oriented vertically.

In accordance with the method and articles comprising the system of the invention, the elongated strips, each bearing a plurality of colored stripes in spaced-apart parallel relation are aligned in rows to form a continuous color spectrum, e.g., ranging from red/blue to blue/violet. The wavelength of visible light in the color spectrum decreases from red to violet. It will also be understood that the starting point in the color spectrum is arbitrary for the purposes of the lay-out of the display racks, fan decks, and other display guides described. Color designers working in the field treat the color spectrum as circular, i.e., as a wheel or a ring, even though the color racks, by practical necessity, are two-dimensional and planar, or essentially so.

What defines the invention and distinguishes it from the prior art is the use of elongated strips laid out in a side-by-side arrangement in a plurality of horizontal rows, where the adjacent color stripes in a given row are closely-related in color. Thus, when the consumer focuses attention on a specified color or a narrow range of color, she is able to select one or two take-home cards all of which have relatively closely-related colors, which thereby greatly facilitates the process of making the final color selection. The consumer is thus presented with one card containing several closely-related colors and is not distracted by any number of other significantly different colors appearing on the same card.

In a preferred embodiment of the invention, a color display and a display rack is assembled from a plurality of row groupings, each row grouping comprised of a plurality of vertical color steps or gradations ranging from the darkest accent colors at the bottom to the lighter pastel colors at the top. Each vertical step or gradation in color change forms a column of the display rack. From each position in the vertical column in the rack, a color stripe in the horizontal row extending to the right, or to the left, or to the right and left contains a very closely-related color. In fact, if the color display contains a very large number of individual colors, i.e., two thousand or more colors, horizontally adjacent color stripes can be provided with differences that are very subtle and barely discernable by the average viewer.

Within each vertical grouping, the color gradations or steps are prepared using a plurality of different bases. In a preferred embodiment, the lowermost or darkest color is prepared by adding one or more colorants to an accent base (i.e., a base that is transparent, or neutral, and contains no titanium dioxide); the top-most one or more gradations is prepared by adding colorant to a pastel base (as defined above); and the intermediate gradations are prepared by adding colorant to a tint base and a deep base (the latter lying between the tint and accent base rows.)

In a particularly preferred embodiment, up to 2300 colors are displayed and there are five discernable row groupings, and each row grouping contains eight separate steps or gradations. In an especially preferred embodiment, the eight steps or gradations, starting at the top, consist of three rows of colors prepared from pastel bases, two rows of colors prepared from tint bases, two rows of colors prepared from deep bases and; optionally, one row of colors prepared from accent base.

In yet a further preferred embodiment of the invention, the uppermost pastel color stripes are substantially larger than the stripes lower in the column. This embodiment of the invention in which the cards contain larger fields of pastel colors takes into account consumer desires for larger take-home color card samples of the lighter pastel colors, since these are typically used for larger areas, such as interior walls and the like, and the larger color fields facilitate the visualization process employed in the final selection.

In another preferred embodiment, one or more of the rows of colors prepared from accent and deep bases are positioned at the top of a grouping, and below are positioned rows of colors prepared from pastel and tint bases. In this embodiment, larger color stripes of off-white colors prepared from pastel bases are positioned in a row above the strips of standard size.

In accordance with another preferred embodiment of the invention, fan decks are assembled employing elongated strips representing multiples of the side-by-side take-home cards. For example, if an elongated strip used for the display rack take-home card is 5.5 inches long and has three color stripes, a suitable fan deck can be prepared by combining two adjacent strips into a single larger strip having a total of six colors and measuring approximately eleven inches in length.

In the method of the invention, liquid printing compositions of the type known to the prior art are applied to a paper substrate, preferably in the form of a moving web, in a plurality of spaced-apart parallel bands, where the hues of the printing composition correspond to the closely-related hues obtainable from custom-tinting the same class of base used in preparing the desired architectural coating.

BRIEF DESCRIPTION OF THE INVENTION

DETAILED DESCRIPTION OF PREFERRED EMBODIMENTS

Figures 1, 2:
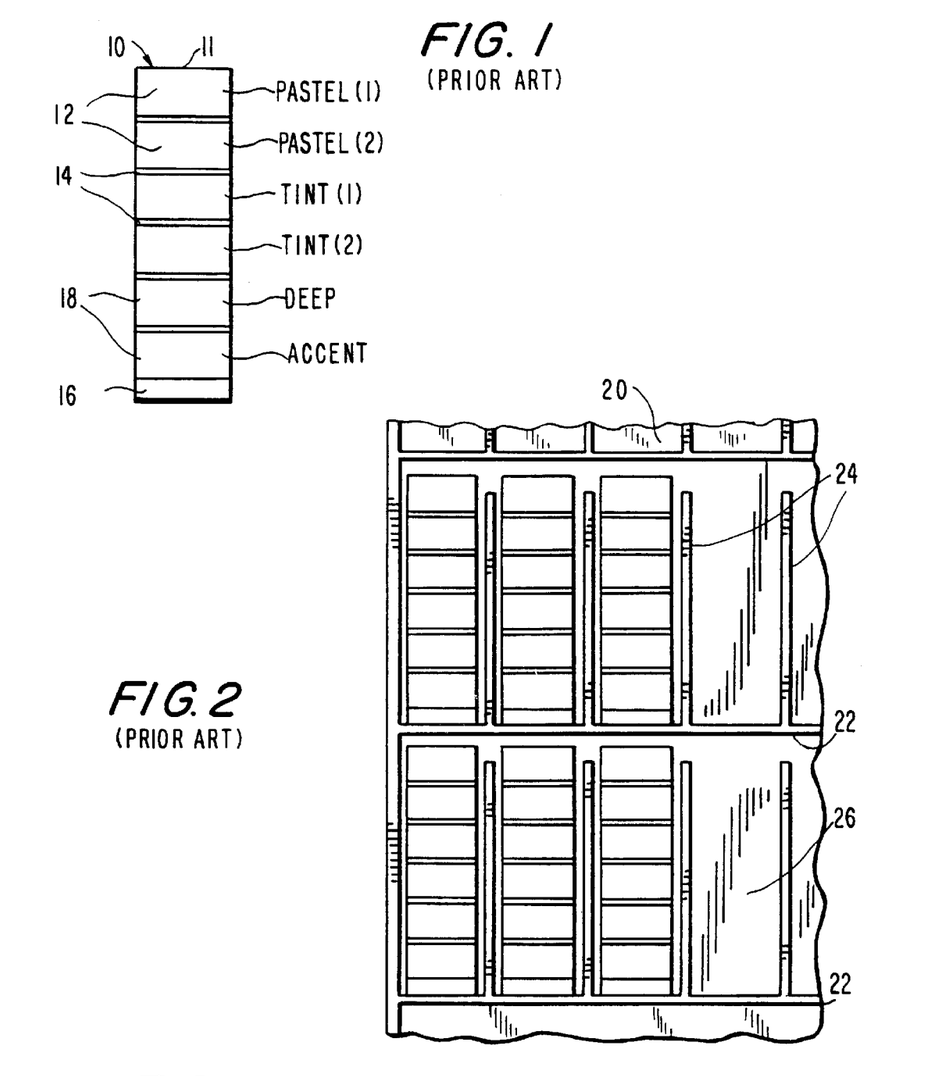
FIG. 1 (Prior Art) is a schematic illustration of a typical take-home card in the form of an elongated strip of the prior art.
FIG. 2 (Prior Art) is a schematic illustration of a small section of a typical color selection and display rack of the prior art containing the strip of FIG. 1 and other typical strips.

As shown in the representative illustrations of FIGS. 1 and 2, the current take-home cards 10 are those which have been in use in the prior art for many decades and are formed from a paper substrate or strip 11 provided with from as few as three, but typically five or six color stripes 12 ranging from a pastel color at the top to a much darker deep tone and/or accent tone at the bottom. The stripes 12 are separated by neutral or unprinted transverse areas 14, and an area 16 below the last stripe which rests on supporting shelf 22 of the rack 20. When provided with printed indicia 18, it is oriented for reading when the longitudinal axis of the card is vertical. The cards are placed in the racks in the same orientation, i.e., the long axis vertically. The rack is fitted with vertical dividers 24 to form a plurality of bins or chip holders 26 adapted to receive a plurality of strips in vertical array. Thus, a customer trying to make a selection among several closely-related pastel colors for painting a wall must necessarily remove three or more separate take-home cards 10 from the rack, which cards also contain numerous other colors that are of no interest and which can serve as distractions and a source of confusion in the final selection process.

Figure 3:
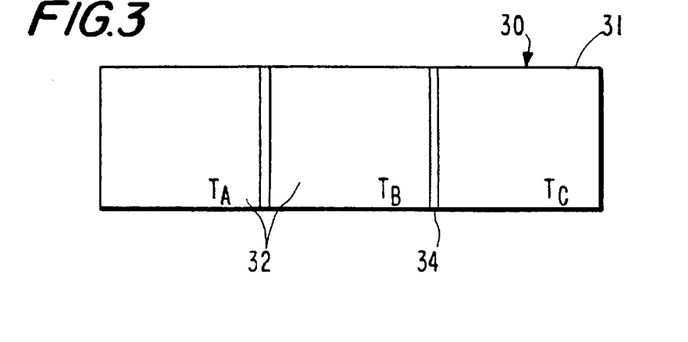
FIG. 3 is a schematic illustration of an improved strip containing a plurality of color stripes in accordance with an embodiment of the invention.

As shown in FIG. 3, the elongated strip 30 of the invention comprises a plurality of colors (e.g., $T_A$, $T_B$ and $T_c$) that are closely related and correspond to the same family of bases (e.g., a tint base "T".) That is, each field of color 32 on the paper substrate 31 of the strip 30 corresponds to a color prepared from a pastel base, a tint base, a deep base or an accent base. Each of the plurality of color fields is in the form of a stripe 32 and is separated from the adjacent color stripe by a relatively narrower white transverse stripe 34. The adjacent color stripes on a given strip are closely related in hue to each other, and to the colors on a horizontally adjacent strip.

In a preferred embodiment, and for the purposes of describing the invention, the visible color spectrum will be arranged in order of decreasing wave-length from left to right, i.e., from red to violet. As will be understood by one familiar with this art, the selection of a starting point in the color spectrum (e.g., red, orange, violet) and the specific size and arrangement of a display are arbitrary. The color spectrum can be treated as a continuum with colors ranging from red-blue and on through the spectrum to blue-violet, so that the two ends of the color display could be joined to form a circular ring or wheel, or a cylindrical color continuum.

Figure 4:
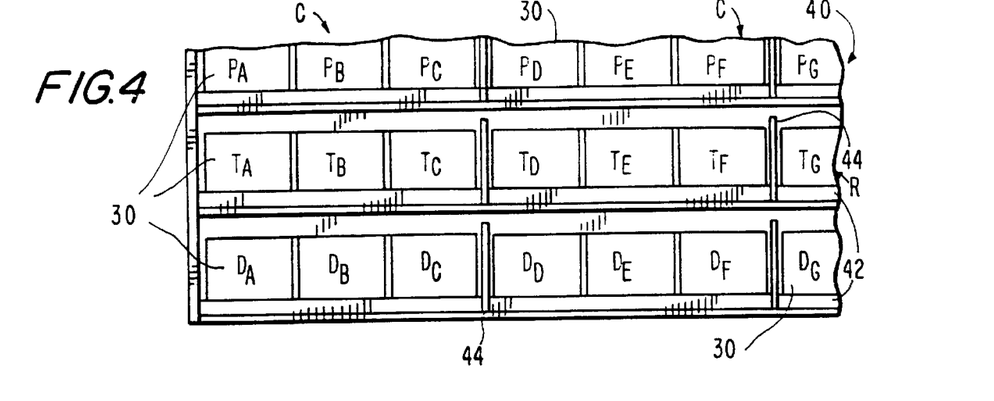
FIG. 4 is a schematic front elevational segmented illustration of a section of a display rack containing the strip of FIG. 3, and other strips in accordance with an embodiment of the invention.
Figure 5:
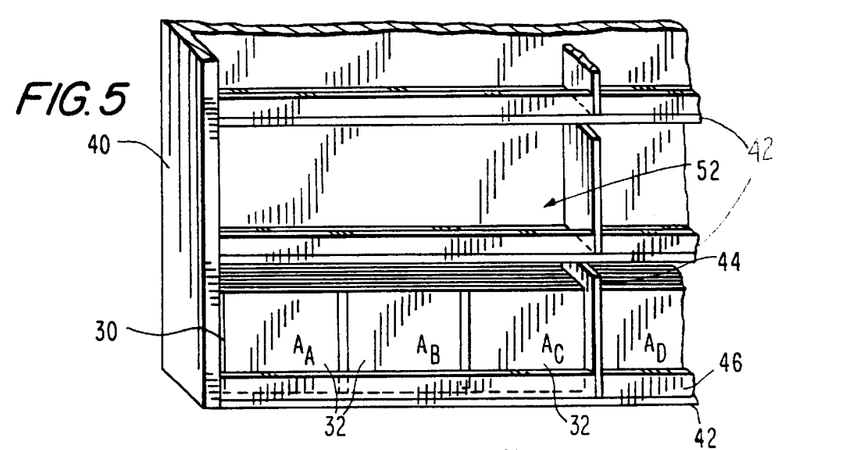
FIG. 5 is a schematic front elevational segmented illustration of a display rack in accordance with one embodiment of the invention.

With reference to FIGS. 4 and 5, a portion of a display rack is illustrated with the take-home cards 30 of the invention arranged in horizontal rows on the rack's supporting shelves 42 separated by vertical dividers 24. For purposes of illustration and this description, the individual color stripes 32 on each card 30 have been identified with the designations $P_A$–$P_G$; $T_A$–$T_G$; and $D_A$–$D_G$. The letters P, T, D and A representing, respectively, a family of colors prepared from pastel, tint, deep and accent bases. The alphabetical subscripts A–G, etc., indicate the close proximity of the hues in the horizontally arrayed color spectrum. In a preferred embodiment, the hues decrease in wave length from left to right along any particular horizontal row R.

As will also be seen in FIG. 4, a particular color stripe at a given position along the horizontal row R also forms an element in a vertical column C. The color variation in the vertical columns C of the invention follows a progression of decreasing lightness values. In a preferred embodiment, the lightest pastel values are at the top of the respective columns C.

In a particularly preferred embodiment of the invention, the color display is arranged in a plurality of rows, each row formed from a plurality of elongated paper strips, where the color stripes correspond to different hues prepared from pastel base; a plurality of rows, each row formed from elongated strips, where the color stripes correspond to a different hue prepared from a tint base; a third plurality of rows, each row formed from a plurality of elongated strips, where the color stripes correspond to hues prepared from deep base; and optionally, a fourth row, said fourth row formed from a plurality of elongated strips, where the stripes correspond to hues prepared from an accent base.

In its broadest conception, the invention comprehends an improved color display and selection guide for use in connection with the sale of custom-tinted coatings, architectural coatings said tinted coatings being prepared by mixing one or more colorants with bases selected from the group comprising pastel base, tint base, deep base and accent base, said color selection display comprising a plurality of paper substrates in the form of elongated strips, each strip containing a plurality of different color fields, each of said color fields corresponding to the color of a custom-mixed coating, where the improvement results from a) providing a first plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from pastel base;

b) providing a second plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from tint base;

c) providing a third plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from a deep base; and optionally, d) providing a fourth plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from accent base;

e) arranging said first plurality of strips in at least one row, the longitudinal axis of the strips being horizontally aligned with the hues corresponding to the natural color spectrum;

f) arranging said second plurality of strips in at least one row, said at least one row being proximate the at least one row of the first plurality of strips, and said color stripes being aligned in columns of decreasing lightness values.

g) arranging said third plurality of strips in at least one row, said at one row being proximate the at least one row of the second plurality of strips, and said color stripes being aligned in columns of decreasing lightness values; and optionally, h) arranging said fourth plurality of strips in at least one row, said at least one row being proximate the at least one row of the third plurality of strips or the at least one row of the first plurality of strips, said color stripes being aligned in columns of decreasing lightness values, whereby each stripe in the display is flanked horizontally by a closely-rerelated color corresponding to a color of a custom-mixed coating prepared from the same base.

Shown in FIG. 5 is a portion of a display rack designed and constructed to receive and retain an array of the improved take-home cards of the invention. In a preferred embodiment, the shelves 42 are transparent and are provided with an upturned lip 46 in order to provide full visibility of the individual color stripes placed on and retained by the shelf. When the display rack 40 is initially stocked or maintained following installation, each of the bins 52 defined by shelves 42 and dividers 44 is provided with a plurality of identical take-home strips. The strips can advantageously be provided with printed indicia identifying each color stripe and the relative position of the strip in the array of the display rack. One of each of the different strips is permanently affixed to the surface of the rack forming the back wall of each of the bins 52 so that there will always be a strip to be viewed by a prospective customer in the event that all of the take-home strips have been removed and not yet replaced.

Figure 6:
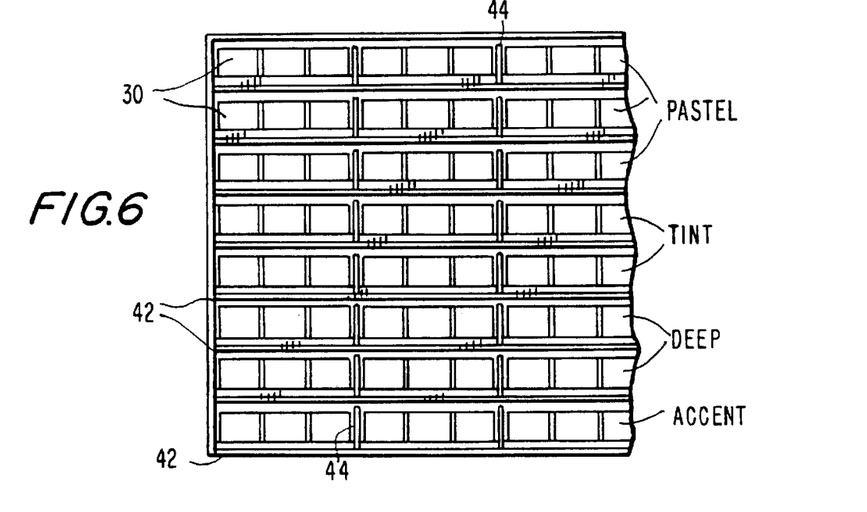
FIG. 6 is a schematic front elevational segmented view of a display rack in accordance with another embodiment of the invention.

A particularly preferred embodiment of the invention is shown in FIG. 6 which schematically illustrates a portion of a display rack containing eight horizontal rows, each row containing a plurality of horizontally disposed strips, each strip having three color stripes. As indicated to the right of the segmented display, the first three rows contain color fields or stripes corresponding to hues prepared from pastel base. The next two subadjacent rows contain hues prepared from tint base, and the two subadjacent rows contain hues corresponding to those prepared from deep base. The final single horizontal row contains stripes corresponding to hues prepared from accent base. Inclusion of the accent base horizontal row is optional and it need not be used in all embodiments of the invention. For example, in smaller systems where the total number of custom colors is 600 or 900, or even about 1200, the manufacturer can elect to exclude the family of accent base hues because they are extremely dark and are among the hues least used for architectural coatings. Thus, in this alternative preferred embodiment, seven (rather than eight) rows are comprised of three horizontal rows of pastel, two rows of tint and two rows of deep base hues. In each case of this embodiment, the highest lightness values are in the hues appearing at the top of each of the columns and are the hues prepared from pastel base.

Shown below in Table I are representative formulations for each of the colors in the first columns of the five groups comprising the color selection and display as illustrated, for example, in FIG. 8. As in the prior description of the invention, the letter designation for each grouping indicates the column and row location: "1-1P" being the first column and first row of colors in the first group derived from pastel base; 3-1T2 being the third column in the same first group, but in the second row of colors derived from tint base; and 2-1A being the second column in the first group in the first (and only) row of colors derived from accent base.

The alpha-numeric designations appearing below the location provide instructions for formulating each color. The first letter corresponds to a specific color dispersion: E-thalo blue (organic); V-magenta (organic) B-lamp black (inorganic); L-raw umber (inorganic) KX-titanium dioxide. Each column from left to right represents one of the five groups from top to bottom in FIG. 8, each group having eight colors.

The letter Y represents one ounce and numbers followed by the letter Y indicate the number ounces of a given colorant dispersion, i.e., 3Y is 3 ounces. Numbers following a Y or not preceded by a Y indicate the addition of $\frac{1}{48}$ th of an ounce of pigment dispersion. For example, E-6 equals $\frac{6}{48}$ ounces of thalo blue; B-2 equals $\frac{2}{48}$ ounces of lamp black; and V-7Y8 equals 7 and $\frac{8}{48}$ ounces of magenta pigment dispersion. This formulation system is based on existing colorant dispensers which are calibrated to accurately dispense $\frac{1}{48}$ th of a fluid ounce.

TABLE I

| COLOR BY GROUP AND ROW | | | | |
|---|---|---|---|---|
| 1-1P | 2-1P | 3-1P | 4-1P | 5-1P |
| E-2 | E-2 | E-2 | B-2 | B-6 |
| V-10 | L-2 | V-8 | V-10 | F-2 |
|  | V-10 |  |  | V-4 |
| 1-1P2 | 2-1P2 | 3-1P2 | 4-1P2 | 5-1P2 |
| E-4 | E-4 | B-2 | B-4 | B-12 |
| V-22 | L-2 | E-2 | V-18 | F-2 |
|  | V-20 | V-18 |  | V-10 |
| 1-1P3 | 2-1P3 | 3-1P3 | 4-1P3 | 5-1P3 |
| E-6 | E-6 | B4 | E-8 | B-24 |
| V-42 | L-2 | E-4 | F-2 | F-4 |
|  | V-42 | V-36 | V-36 | V-20 |
| 1-1T | 2-1T | 3-1T | 4-1T | 5-1T |
| E-10 | E-12 | B-8 | E-16 | B-Y |
| V-Y36 | L-4 | E-8 | F-4 | F-8 |
|  | V-Y36 | V-Y24 | V-Y24 | V-40 |
| 1-1T2 | 2-1T2 | 3-1T2 | 4-1T2 | 5-1T2 |
| E-20 | E-24 | B-16 | E-32 | B-2Y4 |
| V-3Y28 | L-8 | E-16 | F-8 | F-16 |
|  | V-3Y24 | V-3Y | V-3Y8 | V-Y44 |
| 1-1D | 2-1D | 3-1D | 4-1D | 5-1D |
| E-20 | E-24 | B-16 | E-32 | B-2Y4 |
| V-3Y28 | L-8 | E-16 | F-8 | F-16 |

TABLE I-continued

| COLOR BY GROUP AND ROW | | | | |
|---|---|---|---|---|
|  | V-3Y24 | V-3Y | V-3Y8 | V-Y44 |
| 1-1D2 | 2-1D2 | 3-1D2 | 4-1D2 | 5-1D2 |
| E-40 | E-Y | B-32 | E-Y16 | B-4Y8 |
| V-7Y8 | L-16 | E-32 | F-16 | F-32 |
|  | V-7Y | V-6Y | V-6Y16 | V-3Y40 |
| 1-1A | 2-1A | 3-1A | 4-1A | 5-1A |
| E-Y | E-Y | B-20 | E-Y32 | B-4Y40 |
| V-8V | L-20 | E-28 | F-20 | F-36 |
| KX-3Y | V-7Y8 | V-8Y | V-7Y44 | V-4Y20 |
|  | KX-3Y | KX-3Y | KX-2Y | KX-2Y |

As will be understood by one of ordinary skill in the art, the specific formulations for the colors depicted will depend upon several factors, including the total number of custom tinted colors to be included in the display and the customers' preferences for specific colors. Thus, if the total number of colors displayed is only 600, the differences in hues taken along a given horizontal row will be much greater when compared to a display containing 1200 or 2000 custom-tinted colors.

The choice and formulation of pigment dispersions is also within the ability of the color chemist or technician of ordinary skill in the art. The lightest colors or hues prepared in the pastel and tint bases are generally formulated using organic colorant dispersions and those of decreasing lightness levels will incorporate inorganic pigment dispersions and will also use deep base and, optionally, accent base for producing the architectural coating.

Figure 7A:
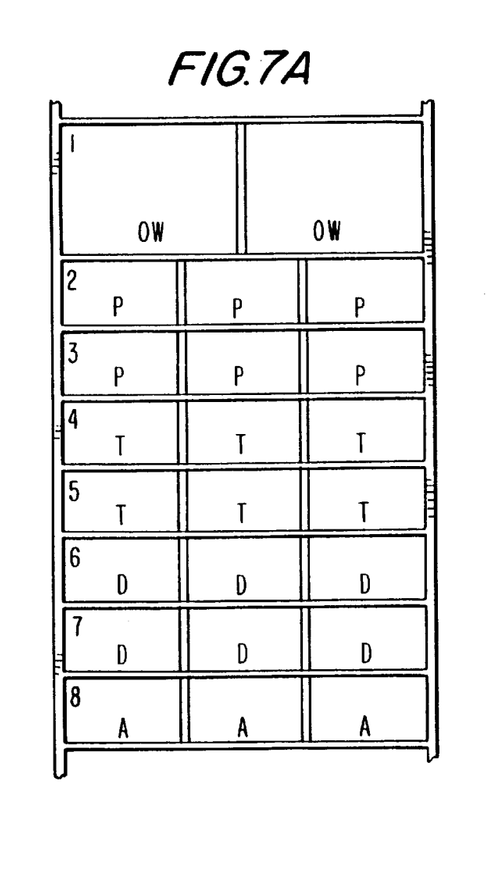
FIGS. 7A, 7B and 7C are schematic illustrations of alternative arrays of a selection of color strips in accordance with preferred embodiments of the invention.
Figure 7B:
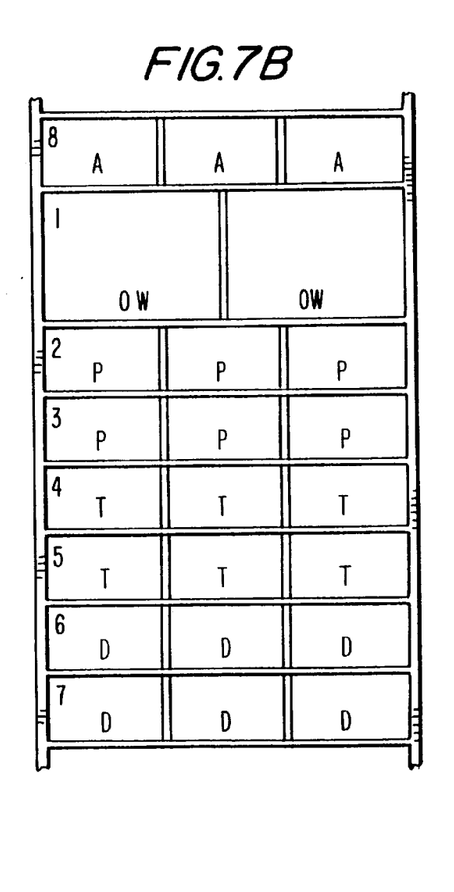
Figure 7C:
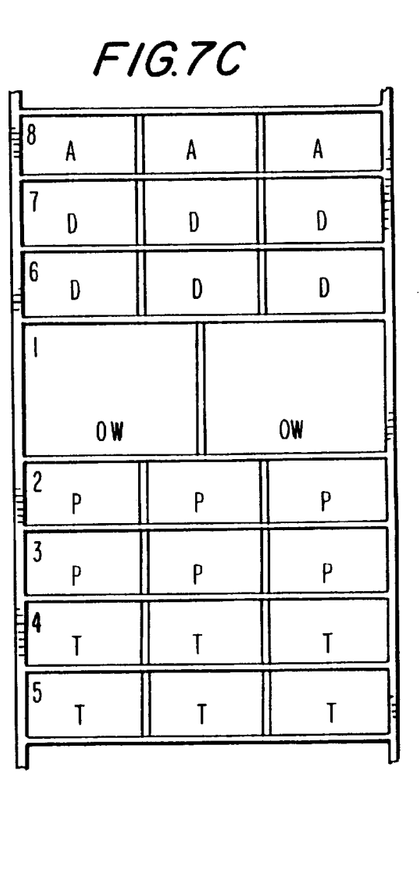

FIGS. 7A, 7B and 7C schematically illustrate several alternate arrays of a selection of color strips as they can be placed in a display rack. For the purposes of describing these embodiments, one of the rows prepared from pastel base is provided on a strip that is substantially higher in its vertical dimension but of the same width horizontally. With reference to FIG. 7A, the strip labelled with the numeral 1 in the top row is approximately twice as high as the strips numbered 2 through 8, which can be said to be of "standard size." These oversized strips have two color stripes rather than the three stripes of the standard strip, and are further differentiated for the purposes of this description with the marking "OW" to designate their color as off-white.

As shown in FIG. 7B, the rows can vary in arrangement by placing the darkest colors, being those prepared from accent base to form the top row, with the lightest OW colors in the row immediately below. In the arrangement illustrated in FIG. 7C, the first row are stirps of colors prepared from accent bases and the second and third rows are formed by strips containing stripes prepared from deep bases, the next row being formed of oversized strips containing stripes of OW colors prepared from pastel base. It will be understood that in each of these various arrangements, the horizontal rows are formed of adjacent stripes or color fields of different hues, and that each of the stripes vary in hue from the adjacent stripe by an increase in the wave length of light when taken in one direction along the horizontal row, or a decrease in the wave length of light if taken in the opposite direction along the same horizontal row.

Figure 8:
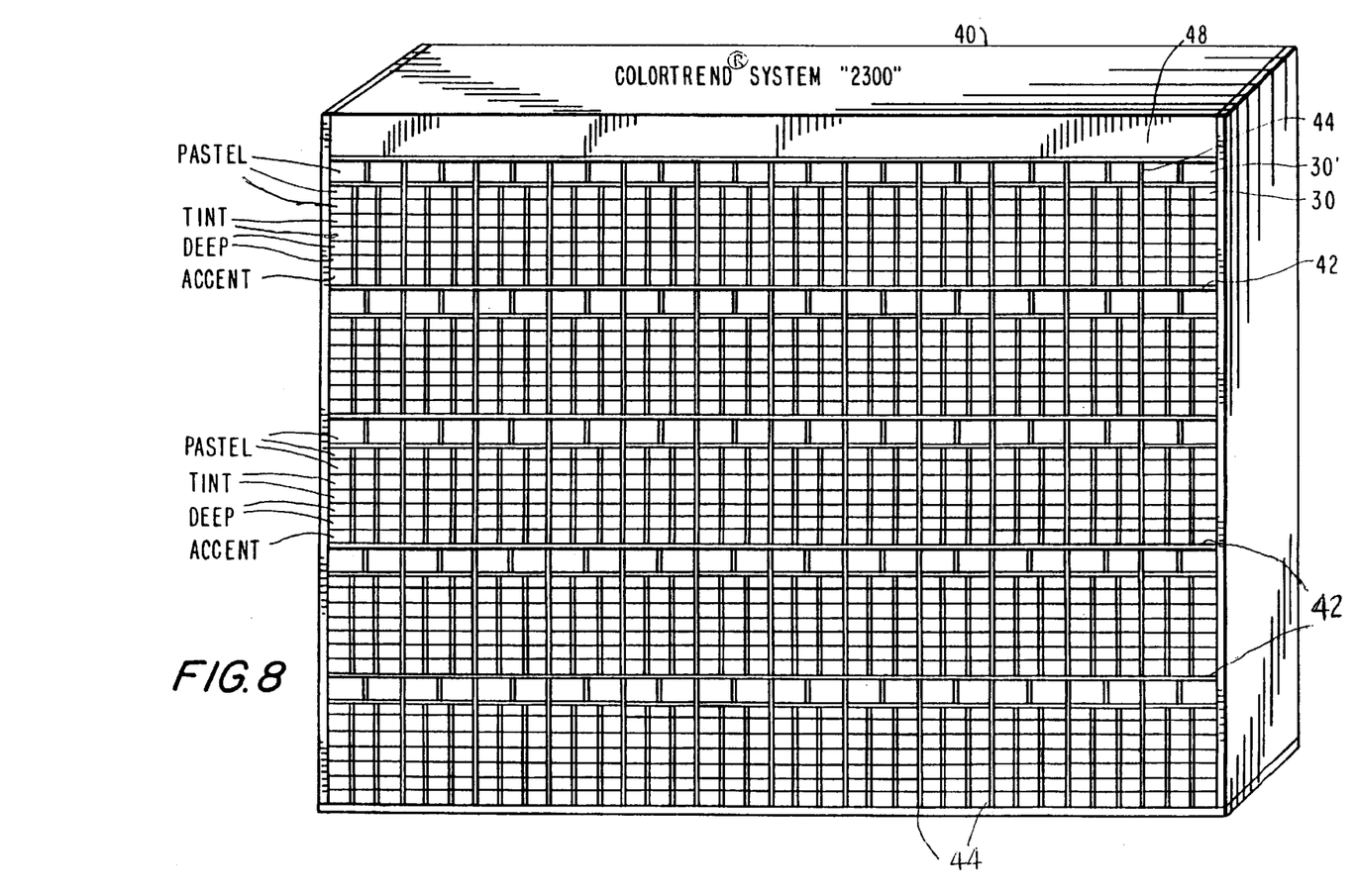
FIG. 8 is a top, front and right side orthogonal view of a display rack in accordance with one embodiment of the invention.

With reference to FIG. 8, there is shown a schematic representation of a display rack 40 which has been constructed and assembled in accordance with a preferred embodiment of the invention. Panel 48 depends from the top edge of the rack and provides a surface for carrying the trademark or name of the system and can serve to conceal lighting fixtures for illuminating the take-home cards in the rack. In this preferred embodiment, the horizontal shelves 42 and vertical dividers 44 have been arranged to provide five separate groupings, with each grouping having eight gradations. Rack 40 therefore has a total of forty shelves. It will be understood that in order to provide portability, a display having up to 2300 different color fields will have to be formed from several separate sections that are assembled after they have been delivered to the display location.

It should be noted in the illustration of FIG. 8 that the first row of strips 30' is depicted as being much larger than the strips on the subsequent horizontal rows. This aspect of the invention was described with reference to FIGS. 7A–7C. This illustration depicts a preferred embodiment in which the upper most horizontal row of pastel hues in each of the five groups is comprised of oversized strips containing larger color stripes than appear elsewhere in the display. These strips are preferably of the same longitudinal or horizontal dimension as strips 30, but are substantially higher and have a greater area than strips 30. It will be understood that rack 40 can also be constructed to display the strips all of which are of uniform size as illustrated in FIG. 6

Figure 9A:
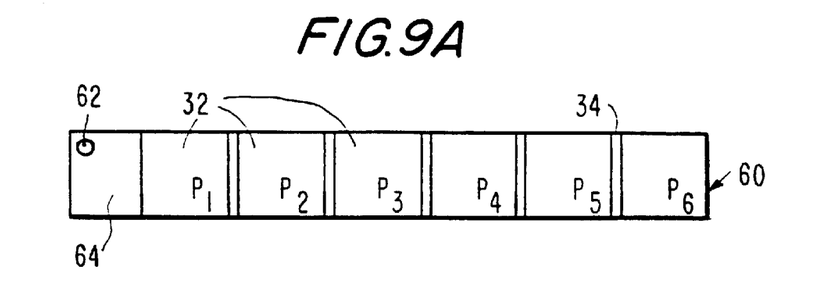
FIG. 9A is a schematic illustration of an improved strip for use in producing fan decks in accordance with an embodiment of the invention.
Figure 9B:
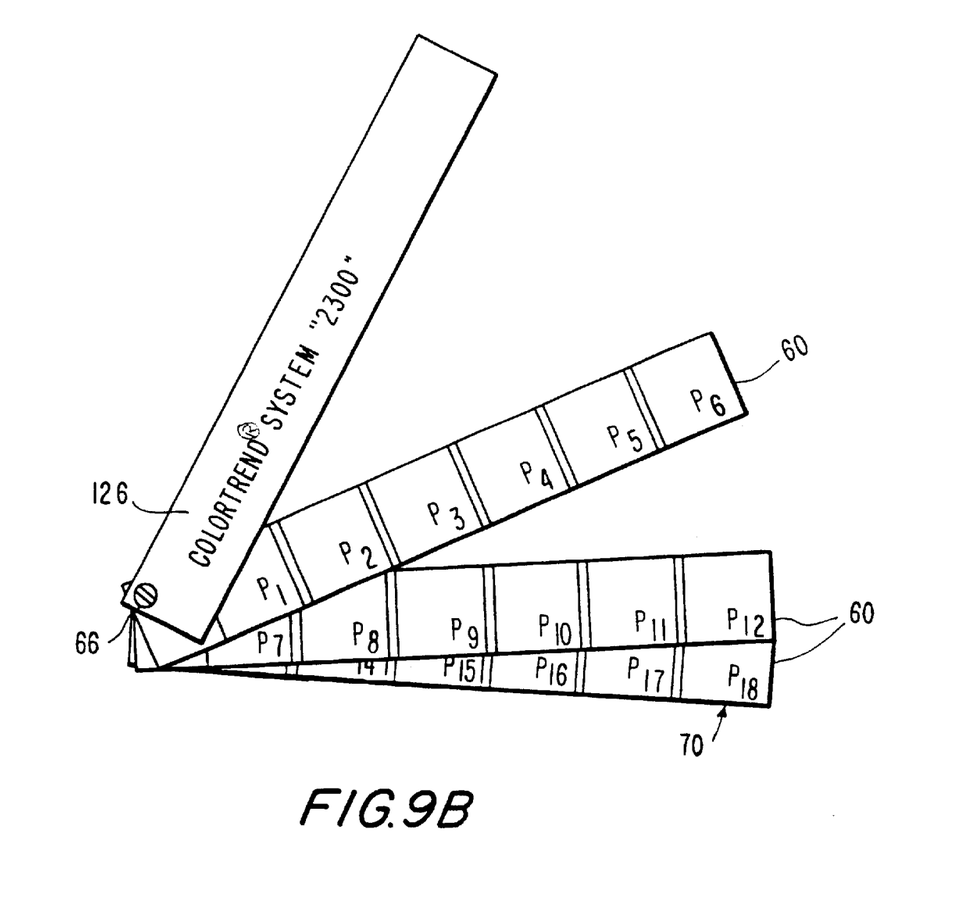
FIG. 9B is a schematic perspective view of a fan deck assembled with the strips of FIG. 9, and other stirps in accordance with the invention.

Another important advantage of the invention is illustrated in FIGS. 9A and 9B, in which a strip 60 which is a multiple in its longitudinal length of strip 30. For example, strip 60 of FIG. 9A contains six stripes, and is double the length of the strips 30 described above, each of which contained three stripes of closely-related hues. As depicted, the stripes are provided with alpha-numeric indicia to represent six closely related pastel hues of decreasing wave length. The substrate of strip 60 is uncoated at one end to leave blank panel 64 which can be punched or drilled with orifice 62 to receive a fastener 66 in order to assemble the strip into a fan deck 70 as shown in FIG. 9B. The fan deck is comprised of a plurality of elongated strips 60 joined to a cover 126 by fastener means 66 in accordance with methods well known in the art. Fan decks produced in accordance with the present invention have the advantage of providing a continuous flow and gradual variation from hue to hue on each page and also through the progression of pages or strips 60 comprising the fan deck. It will also be understood that the strip 60 of FIG. 9A can be trimmed to remove panel 64 and then divided between the third and fourth stripes to produce strips 30 for use in the display rack, the strips containing respectively, hues $P_1$–$P_3$ and $P_4$–$P_6$.

Figure 10:
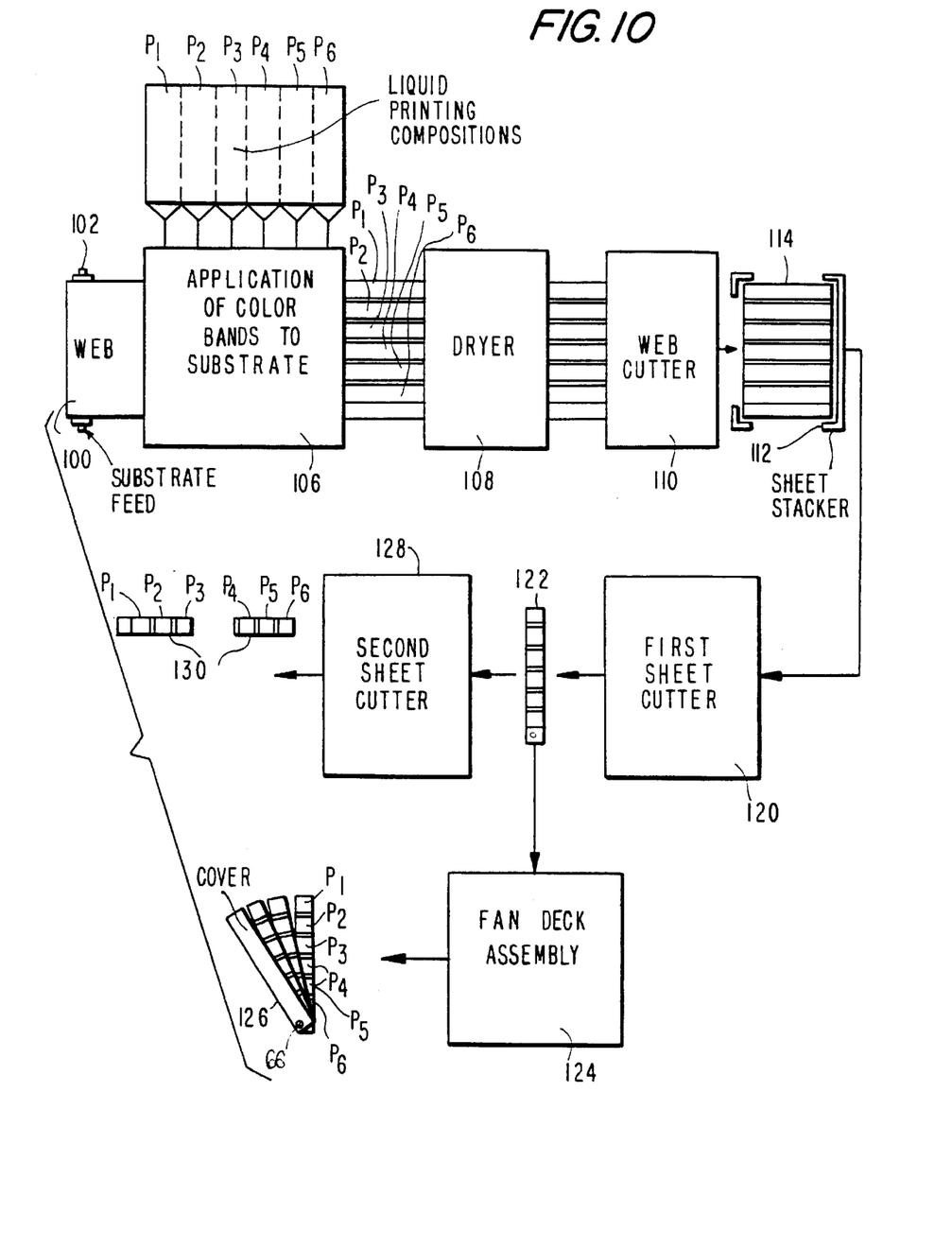
FIG. 10 shows a schematic illustration of one preferred method for producing the elements comprising the elongated strips in accordance with the invention.

FIG. 10 schematically illustrates the method of the invention in which a substrate in the form of a continuous paper web moves relative to applicator means which apply continuous spaced-apart parallel bands to the surface of the web. For the purpose of illustrating the steps of the method, there are shown in FIG. 10, six different but closely related color liquid printing compositions which correspond in hue to those obtained from a corresponding number of custom-tinted pastel base, $P_1$–$P_6$. The color bands are applied parallel to the longitudinal axis of the web in at least one group, but preferably in a plurality of groups, represented by the two groups illustrated in FIG. 10. The web 100 with the multiple groups of parallel bands $P_1$–$P_6$ are transported through a drying station 108 and then through cutting means 110 where the web is cut into sheets along transverse lines, the length of the sheets being determined by the subsequent processing of the sheets. The sheets 114 are accumulated in sheet stacker 112 in a preferred embodiment, and can be wrapped to protect them until further processing is undertaken. Alternatively, the sheet 114 can be cut by the first sheet cutter 120 into narrow strips corresponding to the width of strip 30. Strips 122 have duplicate groupings of stripes which can be separated to form strips having stripes $P_1$–$P_6$ and thereafter processed through fan deck assembler 124 which adds a cover and joins a stack of different strips containing stripes that comprise the complete color system into a unitary fan deck 126.

Returning to an alternative embodiment illustrated in FIG. 10, double strip 122 is divided into two groups and then each group is subdivided to provide a plurality of strips 30 each containing three stripes, one containing stripes $P_1$, $P_2$ and $P_3$ and the other $P_4$, $P_5$ and $P_6$.

Figure 11:
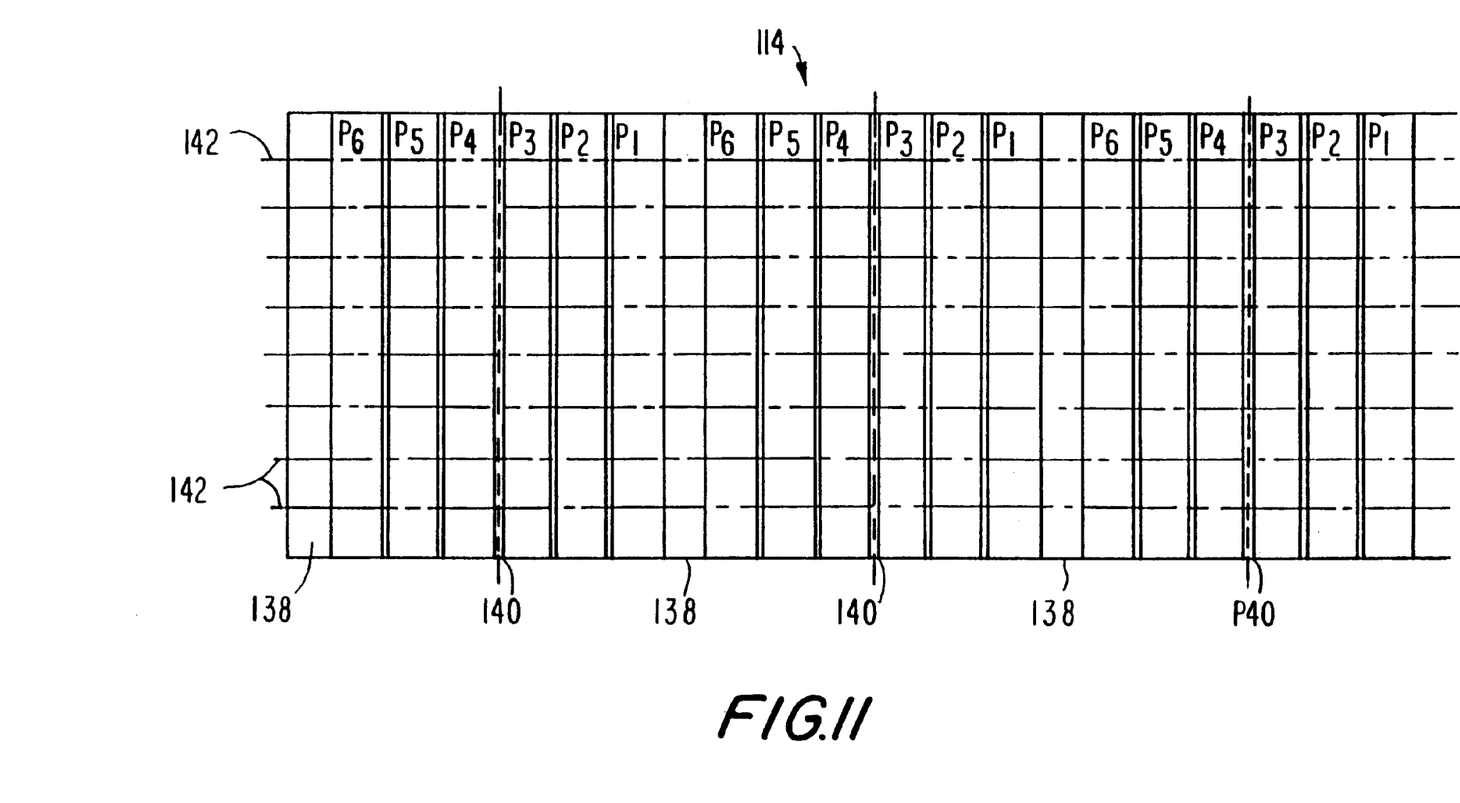
FIG. 11 is a schematic plan view of a composite sheet produced in accordance with FIG. 10 from which the elongated color strips of the invention are cut.

The illustration of FIG. 11 depicts a single sheet 114 produced in accordance with the method described in conjunction with FIG. 10 containing, for example, three repeating sections 130, 132 and 134, each comprising six different color bands $P_1$–$P_6$, being closely related hues. Each of the sections 130, 132 and 134 terminates adjacent an unbanded section 138 which is provided for fastening a group of different trimmed sections together to form a fan deck 126. Within each of the sections 130, 132 and 134, a narrow unbanded section 140 is provided in the event the sections are to be divided into individual take-home strips. Also schematically illustrated in FIG. 11 are horizontal porting or trim lines 142 along which the sheet 114 is trimmed to form the strips for take-home cards or for assembly into fan decks.

As will by understood by one skilled in the art, printed indicia can be applied to the web or to the individual sheets cut from the web. Indicia can include arbitrary color names, alpha-numeric identifiers, trademarks, company name identification on the front and/or the back of the paper substrate corresponding to the finished strip in the form for use in the display or the fan deck, or other form of sales and merchandising aids that are well known in the art.

FIGS. 12A–12D are reproductions of graphic plots of a colormetric system developed by the Commission Internationale d' Eclairage known as the CIE L*a*b* Space.

This analytic system for assigning numerical values to any given color is in widespread commercial use and provides a numerical and graphical means of depicting colors and their relationship. The a-axis defines the redness (+) to greenness(–) and the b-axis the yellowness(+) to blueness(–). In this analytical system, the chroma value increases with the distance from the zero point. For purposes of illustration and scale, colors having a chroma value from 0 to 20 are omitted, thereby leaving an open circular central core area.

The individual data points were derived from a spectrophotometric measurement of each of the individual color stripes in the four color displays or fan decks using a Datacolor International Model "SpectraFlash 600" and associated software. For FIGS. 12A–12C, all of the color stripes comprising the display were analyzed by the spectrophotometer and plotted (with the exception of chroma values of less than 20. FIG. 12D was obtained by analyzing the color stripes produced in accordance with the invention that comprised the upper-most group of five groups as illustrated, for example, in the display of FIG. 8, but excluding any values in the zero to 20 range.

Figure 12A:
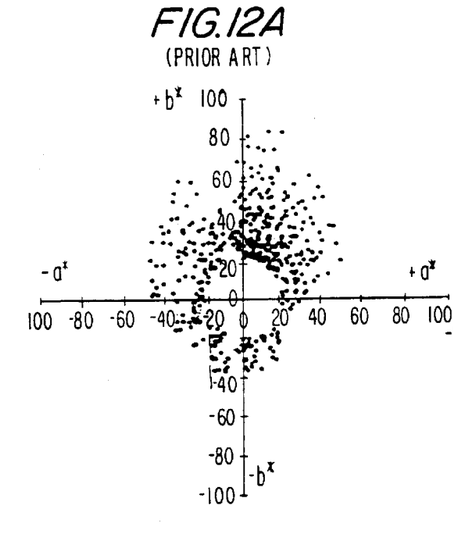
FIGS. 12A, 12B, 12C and 12D are reproductions of computer-generated prints produced by showing the distribution of color values of three prior art color display systems (A0C) and of the present invention (D).
Figure 12B:
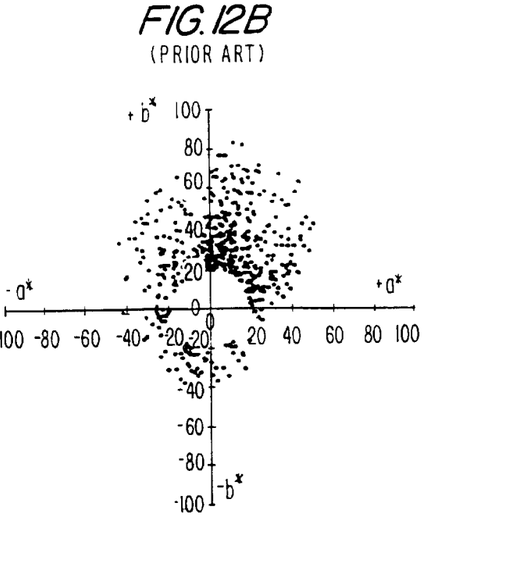
Figure 12C:
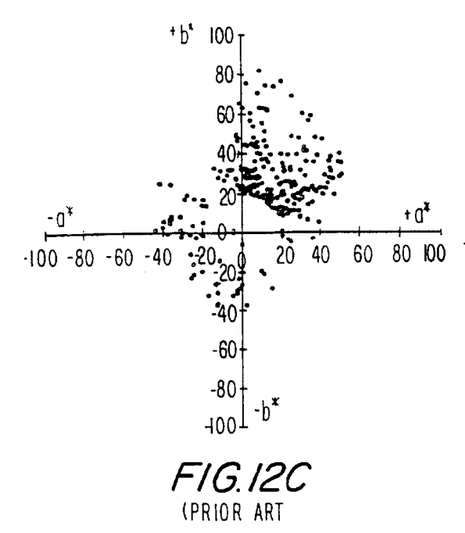
Figure 12D:
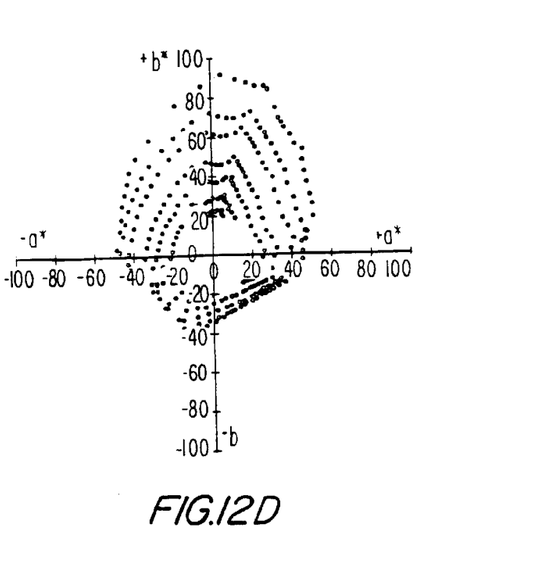

FIGS. 12A and 12B were obtained from two prior art color identification and selection systems sold by Creanova Inc. (formerly Hüls America Inc.) and FIG. 12C is based on a competitive prior art system offered by a supplier of pigment dispersions and paints from outside of the United States. FIG. 12D is a printout based on the system of the present invention. The printouts of FIGS. 12A–12C graphically show that the colors and chroma values are not evenly distributed. In all of the prior art systems, the data points are heavily concentrated in one, or at best two of the upper quadrants, with a very poor distribution in any given quadrant. By comparison, the data points derived from the present system show generally concentric arcs of relatively uniform spacing, both above and below the a-axis and to either side of the b-axis.

The plot of FIG. 12D indicates a uniform gradation of color, hue and lightness with respect to each of the axes and throughout each of the quadrants. The system also is indicated to have an improved uniformity in the stepwise increase in chroma values above and below the a-axis. This improved uniformity provides an advantage in using the display for color identification and selection, since the color variations are more regular and predictable within a given range than those of the prior art.

Although the invention has been shown and described with respect to certain preferred embodiments, it is obvious that equivalent alterations and modifications will occur to others skilled in the art upon the reading and understanding of the specification. The present invention includes all such equivalent, alternations and modifications, and is limited only by the scope of the following claims.

I claim:

1. An improved color selection display for use in collection with the sale of custom-tinted architectural coatings, said tinted coatings being prepared by mixing one or more colorants with bases selected from the group comprising paste base, tint base, deep base and accent base, said color selection display comprising a plurality of paper substrates in the form of elongated strips, each strip containing a plurality of different color fields, each of said color fields corresponding to the color of a custom-mixed coating, the improvement characterized by:
   a) a first plurality of elongated paper strips, each strip containing a plurality of adjacent color fields in the form of stripes of a different hue, each of said stripes varying in hue by an increase in wavelength of light along the longitudinal axis of the elongated strip, where each of said plurality of color stripes corresponds to a different color prepared from pastel base;
   b) a second plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from tint base;
   c) a third plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from a deep base; and
   d) a fourth plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from accent base;
   e) said first plurality of strips aligned in at least one row, the longitudinal axis of the strips being horizontally aligned with the hues corresponding to the natural color spectrum;
   f) said second plurality of strips aligned in at least one row, said at least one row being proximate the at least one row of the first plurality of strips, and said color stripes being aligned in columns of decreasing lightness values;
   g) said third plurality of strips aligned in at least one row, said at least one row being proximate the at least one row of the second plurality of strips, and said color stripes being aligned in columns of decreasing lightness values; and,
   h) said fourth plurality of strips aligned in at least one row, said at least one row being proximate the at least one row of the third plurality of strips or the at least one row of the first plurality of strips, and said color stripes being aligned in columns of decreasing lightness values, whereby each stripe in the display is flanked horizontally by a closely-related color corresponding to a color of a custom-mixed coating prepared from the same base.

2. The color selection display of claim 1 where
   a) the first plurality of strips corresponding to colors prepared from pastel base are arranged in three rows of pastel colors;
   b) the second plurality of strips corresponding to colors prepared from tint base are arranged in two rows of tint colors;
   c) the third plurality of strips corresponding to color prepared from deep base are arranged in two rows of deep colors; and optionally,
   d) the fourth plurality of strips corresponding to colors prepared from accent base are arranged in one row of accent colors.

3. The color display of claim 1 where the first, second, third and optionally, the fourth plurality of color strips are divided into a plurality of groups, each group comprising a plurality of horizontal rows of closely-related colors, each of said rows containing color strips corresponding to the same color base, said groups being vertically aligned, one above the other.

4. The color display of claim 3 consisting of five groups, where each group consists of eight rows.

5. The color display of claim 4 which consists of at least 2000 colors.

6. The color selection display of claim 2 where the two rows of tint colors are subadjacent the three rows of pastel colors, the two rows of deep colors are subadjacent the two rows of tint colors, and, optionally, the one row of accent colors are subadjacent the two rows of deep colors.

7. The color selection display of claim 1 where the elongated strips are the same size.

8. The color selection display of claim 1 where the area of each of the pastel color stripes in at least one row is greater than the area of the individual stripes on the strips corresponding to the tint, deep and accent colors.

9. The color display of claim 8 where the width of the elongated strips containing color stripes corresponding to colors prepared from the pastel base is greater than the width of the strips corresponding to the tint, deep and accent base colors.

10. The color display of claim 9 where the pastel base color strips are approximately twice as wide as the strips corresponding to the tint, deep and accent base color strips.

11. The color display of claim 1 where the stripes at the top of each of the columns is a pastel hue exhibiting a greater lightness value than the stripes lower in that column.

12. The color display rack of claim 3 where the first horizontal row of each group of strips is comprised of stripes of pastel hues, and each pastel stripe at the top of each of the columns in each of the groups exhibits a greater lightness value than the stripes that are lower in the column in that group.

13. The color display rack of claim 12 where each of the groups contains the same number of horizontal rows.

14. The color display rack of claim 12 where each group has the same number rows of color strips corresponding, respectively, to the colors prepared from pastel base, tint base, deep base and, optionally, accent base.

15. A kit for stocking a color selection display rack to provide the color selection display of claim 1, said kit comprising:

a) a first plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from pastel base;

b) a second plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from tint base;

c) a third plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from a deep base; and optionally, d) a fourth plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from accent base.

16. The kit of claim 15 comprising strips containing three stripes.

17. The kit of claim 16 which further comprises strips containing two pastel hues.

18. The kit of claim 15 further comprising multiple copies of each strip.

19. The kit of claim 18 where the multiple copies of each of said strips are packaged.

20. The kit of claim 15 where each of the strips is provided with printed indicia associated with the relative location of the strip in the display rack.

21. An improved color selection display for use in connection with the sale of custom-tinted architectural coatings, said tinted coatings being prepared by mixing one or more colorants with bases selected from the group comprising pastel base, tint base, deep base and accent base, said color selection display comprising a plurality of paper substrates in the form of elongated strips, each strip containing a plurality of different color fields, each of said color fields corresponding to the color of a custom-mixed coating, the improvement characterized by a) a first plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from pastel base;

b) a second plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from tint base;

c) a third plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from a deep base; and, optionally, d) a fourth plurality of elongated paper strips, each strip containing a plurality of adjacent color fields in the form of stripes of a different hue, each of said stripes varying in hue by an increase in the wavelength of light along the longitudinal axis of the elongated strip, where each of said plurality of color stripes corresponds to a different color prepared from accent base;

e) said first plurality of strips aligned in at least one row, the longitudinal axis of the strips being horizontally aligned with the hues corresponding to the natural color spectrum;

f) said second plurality of strips aligned in at least one row, said at least one row being proximate the at least one row of the first plurality of strips, and said color stripes being aligned in columns of decreasing lightness values;

g) said third plurality of strips aligned in at least one row, said at one row being proximate the at least one row of the second plurality of strips, and said color stripes being aligned in columns of decreasing lightness values; and, optionally, h) said fourth plurality of strips aligned in at least one row, said at least one row being proximate the at least one row of the third plurality of strips or the at least one row of the first plurality of strips, and said color stripes being aligned in columns of decreasing lightness values, whereby each stripe in the display is flanked horizontally by a closely-related color corresponding to a color of a custom-mixed coating prepared from the same base.

22. The color selection display of claim 21 where a) the first plurality of strips corresponding to colors prepared from pastel base are arranged in three rows of pastel colors;

b) the second plurality of strips corresponding to colors prepared from tint base are arranged in two rows of tint colors;

c) the third plurality of strips corresponding to colors prepared from deep base are arranged in two rows of deep colors; and, optionally, d) the fourth plurality of strips corresponding to colors prepared from accent base are arranged in one row of accent colors.

23. The color display of claim 21 where the first, second, third and, optionally, the fourth plurality of color strips are divided into a plurality of groups, each group comprising a plurality of horizontal rows of closely-related colors, each of said rows containing color strips corresponding to the same color base, said groups being vertically aligned, one above the other.

24. The color display of claim 23 consisting of five groups, where each group consists of eight rows.

25. The color selection display of claim 24 where the two rows of tint colors are subadjacent the three rows of pastel colors, the two rows of deep colors is subadjacent the two rows of tint colors, and, optionally, the one row of accent colors are subadjacent the two rows of deep colors.

* * * * *